(12) United States Patent
Vökel

(10) Patent No.: US 8,944,728 B2
(45) Date of Patent: Feb. 3, 2015

(54) SCREW TAP

(76) Inventor: Klaus Peter Vökel, Remscheid (DE)

(*) Notice: Subject to any disclaimer, the term of this patent is extended or adjusted under 35 U.S.C. 154(b) by 845 days.

(21) Appl. No.: 12/998,194

(22) PCT Filed: Sep. 22, 2009

(86) PCT No.: PCT/EP2009/006812
§ 371 (c)(1),
(2), (4) Date: Mar. 25, 2011

(87) PCT Pub. No.: WO2010/034455
PCT Pub. Date: Apr. 1, 2010

(65) Prior Publication Data
US 2011/0176880 A1  Jul. 21, 2011

(30) Foreign Application Priority Data

Sep. 25, 2008 (DE) .......................... 10 2008 049 029

(51) Int. Cl.
*B23G 5/06* (2006.01)
*B23B 31/00* (2006.01)

(52) U.S. Cl.
CPC .............. *B23G 5/06* (2013.01); *B23G 2200/44* (2013.01); *B23G 2225/32* (2013.01); *B23G 2200/46* (2013.01); *B23B 31/005* (2013.01)
USPC ............................ 408/226; 408/144; 408/222

(58) Field of Classification Search
CPC .. B23G 5/06; B23G 2200/44; B23G 2200/46; B23G 2225/32
USPC ............................ 408/222, 226, 215; 470/198
IPC ........................................................ B23G 5/06
See application file for complete search history.

(56) References Cited

U.S. PATENT DOCUMENTS

| | | | | |
|---|---|---|---|---|
| 420,189 A * | 1/1890 | Clark et al. | ................... | 408/222 |
| 1,174,294 A * | 3/1916 | Sharp | ................. | 470/19 |
| 1,258,239 A * | 3/1918 | Oster | ............... | 408/200 |
| 1,475,561 A * | 11/1923 | Bath et al. | ................... | 408/222 |
| 1,520,714 A | 12/1924 | Hanson | | |
| 2,335,741 A | 11/1943 | Pasquale | | |
| 2,351,827 A | 6/1944 | Mcallister | | |
| 3,945,069 A * | 3/1976 | Cecil | .............. | 470/198 |
| 4,116,578 A * | 9/1978 | Gelfand et al. | ............... | 408/222 |
| 4,762,444 A | 8/1988 | Mena | | |
| 5,234,293 A * | 8/1993 | Mena | ................ | 408/57 |
| 6,098,499 A * | 8/2000 | Pool | .............. | 81/53.2 |
| 6,554,550 B2 * | 4/2003 | Chapel et al. | ................ | 408/1 R |
| 6,746,186 B2 * | 6/2004 | Ukai | ............... | 408/226 |
| 7,150,588 B2 * | 12/2006 | Hakansson | ................... | 408/222 |
| 7,214,009 B2 * | 5/2007 | Quanz | ................ | 408/222 |

FOREIGN PATENT DOCUMENTS

| | | | | |
|---|---|---|---|---|
| DE | 10200964 A1 * | 7/2003 | ............ | F16B 7/04 |
| JP | 48-071482 | 9/1973 | | |
| JP | 2005052951 A * | 3/2005 | ............. | B23G 5/06 |
| WO | WO-2004-076109 | 9/2004 | | |

* cited by examiner

*Primary Examiner* — Eric A Gates
(74) *Attorney, Agent, or Firm* — Pandiscio & Pandiscio

(57) ABSTRACT

A screw tap includes a shaft having at least one cutting portion and a drive portion. The drive portion is of a cross-section complimentary to tools adapted to act upon the drive portion. The shaft is provided with a recess extending axially thereof and adapted to receive drive device having a cross-section corresponding to the cross-section of the recess.

20 Claims, 2 Drawing Sheets

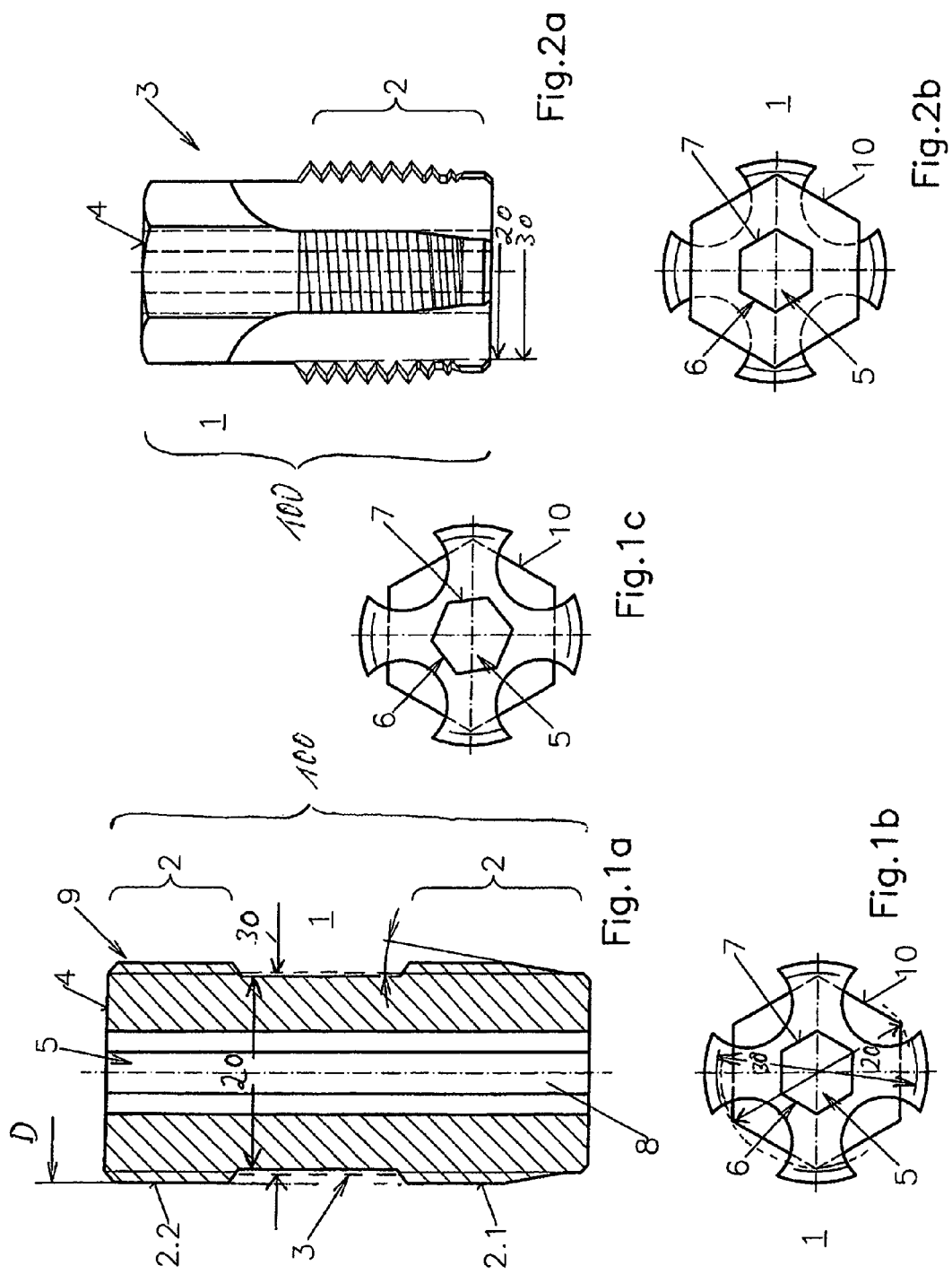

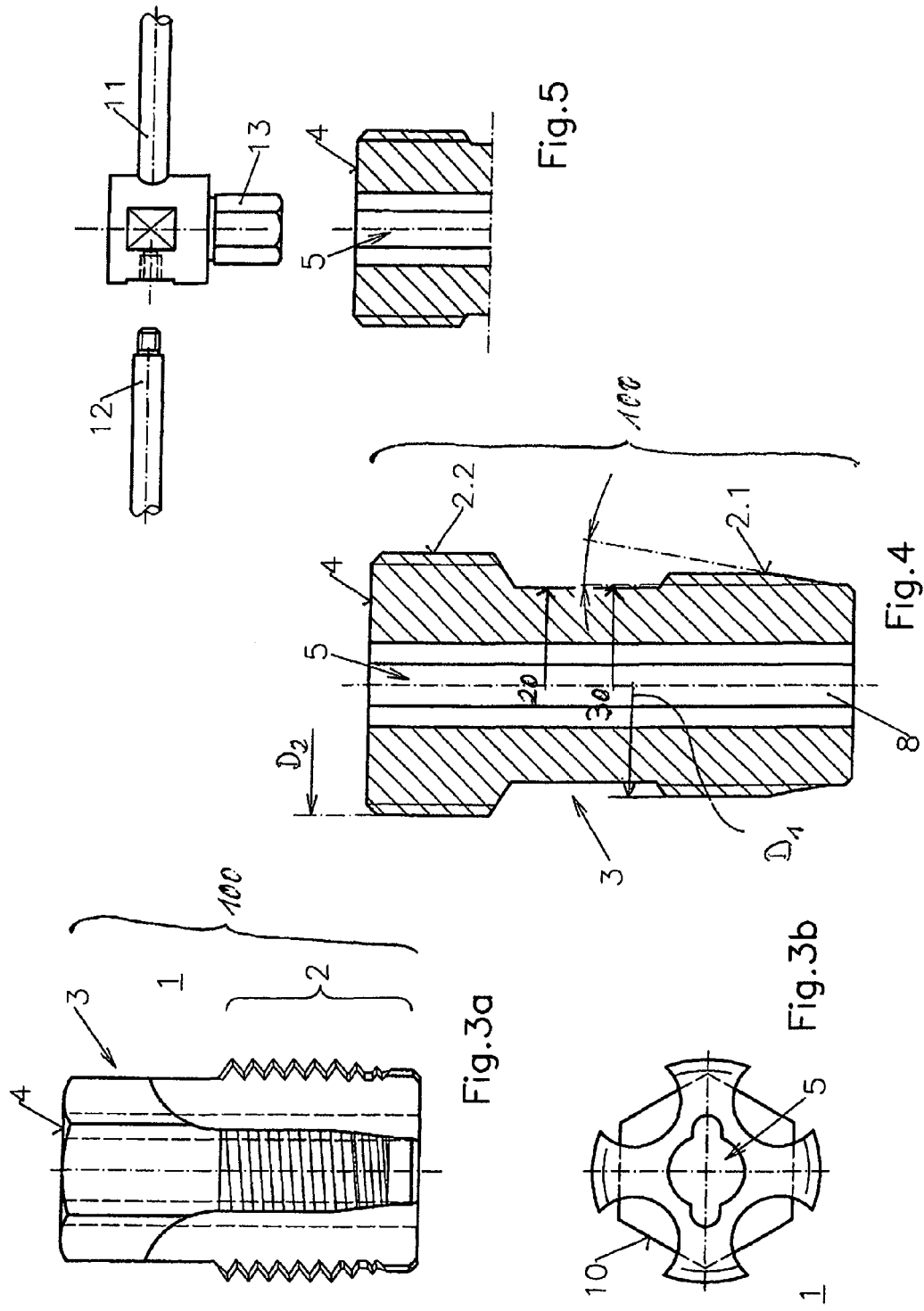

SCREW TAP

BACKGROUND OF THE INVENTION

1. Field of the Invention

The present invention is directed to a screw tap.

2. Description of the Prior Art

Known from DE 1 676 426 U are screw taps having a central drive portion with a square cross section, so that the drive torque necessary for the cutting forces can be reliably transmitted from the tap wrench to the screw tap by the principle of positive locking to the drive portion. Such screw taps are used, for example, as manual screw taps, and are expediently driven by hand with a tap wrench. It is to be considered a particularity that the known screw tap has a respective cutting portion on each of the two sides of the drive portion. Also known are screw taps implemented as manual or machine screw taps that are provided endwise with a square pin and a cutting portion attached thereto.

DE 91 14 307 discloses a screw tap in which the drive portion is shaped as a hexagon. A screw tap of this kind can thus be readily inserted in a standard drilling machine chuck and, moreover, can also be used as a bit with a commercial hand power drill. For this purpose, the hexagonal pin is also provided with retaining notches that make it possible for a screw tap of this kind to be locked in place in the hexagonal socket of the hand power drill.

Known from U.S. Pat. No. 2,408,565 are disk-shaped screw taps provided with a central square hole for receiving a square pin of a drive portion disposed at the end of a shaft that is separate from the screw tap.

SUMMARY OF THE INVENTION

The object of the present invention is to develop the known screw tap further in such a way that the drive options for driving the screw tap in order to apply the cutting forces are expanded or even improved.

It is essential that in addition to the drive portion disposed on the outer periphery of the shaft and to which a driving tool can be fitted, a non-circular recess is also introduced into the shaft's front end, which remains accessible from the outside when the tool is being used as intended. Non-circular means that a pin provided with a corresponding positive cross section is prevented from undergoing free rotational movement in the recess.

It is also essential that the recess extends with its negative cross section in the axial direction of the screw tap and is suitable for receiving a positive-locking drive having a positive cross section corresponding to the recess.

In this way, for example, a simple right-angle socket wrench having a cross section corresponding to the recess can be inserted into the front end of the screw tap, either alone or in addition to a tool acting on the outer drive portion. The invention thus provides the additional option, on the screw tap, that the torque necessary to generate the cutting force can be applied to said screw tap manually with tools of particularly simple design, either alone or in addition to a tool acting on the drive portion.

In this connection, the shaft is preferably implemented in one piece with the drive portion and the at least one cutting portion, and also comprises the central front-end recess.

The invention has recognized that in view of the increasing size of thread to be cut, proportionate tap wrenches have become "clumsier" to handle. According to the invention, a relatively large tap wrench can be replaced by a substantially smaller socket wrench in order to drive the screw tap. In this case, the lever arm of a socket wrench as described above can, for example, easily be widened by means of a cylindrical adapter.

Tap wrenches can often be hard to use, for example in inaccessible locations on workpieces, when the arms of the tap wrench collide with the workpiece as thread is being cut.

In such situations a tap wrench implemented according to the invention can be driven more easily, for example by means of a socket wrench. In addition thereto, under such difficult working conditions on the workpiece, it may also be contemplated to insert a ratchet wrench with a suitably fashioned adapter into the front end of the screw tap. In this way, threads can easily be recut in hard-to-access locations on machines, using a ratchet wrench, for example, without the need to perform set-up work.

Advantageously, a two-handled ratchet wrench can also easily be used as an alternative to a tap wrench, especially for cutting particularly large threads.

The invention has further recognized that the inner drive, which according to the invention is accessible at the front end of the shaft of the tap screw in addition to the outer drive, is fully sufficient for generating a thread cutting torque by means of a suitable tool.

The outwardly disposed drive portion can also, therefore, have a smaller diameter than the core diameter of the cutting portion, with the result that the entire length of the screw tap can be used to cut threads, since the outwardly disposed drive portion extends without contact inside the thread.

The inner drive can extend all the way through the shaft, such that the induced torque can be introduced into the screw tap over the entire switching face. In the case of inner drives with large cross sections, this makes it possible to induce high torques despite thin walls.

In an advantageous further development of the inventive positive-locking drive, it is conceivable for the recess to be modeled, for example, on the locking function of a hexagonal socket of a manual screw machine, with the result that, for example, socket wrenches or ratchet wrench adapters suitably implemented with retaining notches are securely connected to the screw tap in their use position.

From an overall standpoint, for one thing, the invention offers expanded options for the structural design of screw taps; for another, the utility value of screw taps according to the invention is increased.

The negative cross section can be, for example, a square, elliptical or star-shaped cross section, as long as the corresponding positive cross section of the positive-locking drive, in its use position relative to the longitudinal axis of the screw tap, engages positive-lockingly, at least in one direction of rotation, in the negative cross section of the recess.

The negative cross section preferably forms a polygonal line. In a preferred variant embodiment, the polygonal line forms a hexagon or a square.

A hexagonal recess offers the essential advantage that commercially available tools, such as, for example, socket wrenches for hex socket screws, can be used for torque transmission on the screw tap according to the invention.

The recess can be configured as a blind hole or, in a preferred variant, as a through-hole.

A through-hole here furnishes the particular advantage that the inventive screw tap can be driven either at its drill bit head alone or actually simultaneously at its drill bit tip.

The outwardly disposed drive portion still remains accessible even in that case.

In a further development, the screw tap has a front and a rear cutting portion and, disposed between them, an outer drive portion.

For this variant embodiment, it is provided in particular that the front cutting portion is suitable for rough thread cutting and the rear cutting portion for finish thread cutting.

In this way, the screw tap can be used, for example, as a hand screw tap. In addition, a rear cutting portion implemented in this fashion provides the screw tap with a pilot pin.

To further improve the guide characteristics of the rear cutting portion designed as a finish cutter, it is proposed that the rear cutting portion form, together with the front cutting portion, a merely interrupted, but full-length, coil, and that it have, at least at its end facing away from the front cutting portion, a thread profile that is at least nearly complete in cross section.

It is further proposed for said variant embodiment that the cutting portions be spaced apart from each other by a drive portion whose periphery is of smaller diameter than the core diameter of the thread cutting portion.

In this case, the cross section of the outer contour of the drive portion should be complementary to the tool cross sections capable of acting on external contours for purposes of torque transmission.

The inner positive-locking drive according to the invention adds another drive option to the above inherently known drive option for screw taps, thus increasing the utility value of a screw tap according to the invention.

The screw tap can also advantageously be oriented to the workpiece through the use of a tool applied midway in the longitudinal direction of the screw tap and a tool applied to the positive-locking drive.

It is also conceivable for the screw tap to have a front cutting portion and a rear drive portion.

The drive portion is preferably configured as square or hexagonal in cross section. In this way, a screw tap according to the invention can also, for example, be driven by means of commercially available open-ended wrenches or tap wrenches.

The screw tap is preferably intended for cutting metric threads, a screw tap according to the invention readily being suitable for Whitworth gas thread and for all other forms of thread, such as, for example, for the cutting of motion threads, round threads, threads in inches, or manufacturer-specific special threads.

The screw tap is preferably intended for cutting thread sizes of M12 and above.

The screw tap is further preferably made of high-speed steel.

BRIEF DESCRIPTION OF THE DRAWINGS

The invention is described in more detail below with reference to exemplary embodiments.

The figures show:

FIG. 1a: an exemplary embodiment of a screw tap according to the invention in full section;

FIG. 1b: a plan view of the screw tap according to FIG. 1a;

FIG. 1c: a bottom view according to FIG. 1a;

FIG. 2a: a further exemplary embodiment of a screw tap according to the invention in front view;

FIG. 2b: the plan view of the screw tap according to FIG. 2a;

FIG. 3a: a further exemplary embodiment of the invention in front view;

FIG. 3b: a plan view of the screw tap according to FIG. 3a;

FIG. 4: a further exemplary embodiment of a screw tap according to the invention in full section;

FIG. 5: a drive option according to the invention acting on the screw tap to effect torque transmission.

DESCRIPTION OF THE PREFERRED EMBODIMENTS

Unless otherwise stated below, the following description always applies to all the figures.

The figures show a screw tap 1 according to the invention, comprising a shaft 100 of longitudinally cylindrical appearance having at least one cutting portion 2 and a drive portion 3.

The drive portion 3 is accessible from the outside and therefore serves as the outer drive of the screw tap 1.

For this purpose, the drive portion 3 is given a contour to which a tool provided with a complementary contour can be fitted.

The tool is, for example, a tap wrench or an open-ended wrench or the like.

Via the externally applied tool, the torque is then normally introduced into the drive portion 3 and from there transmitted to the cutting portion.

Fundamentally, therefore, the figures all show a screw tap provided with a shaft 100, both the drive portion 3 and the at least one cutting portion 2 being fabricated in one piece from a single workpiece and thus forming a continuous shaft 100.

On this point, it should be expressly stated that by virtue of the present invention, which will be described in more detail below, such a screw tap can also be comprised of individual components that separate radially relative to the longitudinal axis of the shaft, and are connected to one another, via a suitable insertion tool that inserts in the inner recess 5, in such a way that the drive portion and the cutting portion 2 function as a single tool.

It is essential that the shaft 100 be hollow on the inside. For this purpose, a recess 5 that is non-circular in cross section is introduced into the front end 4 of the shaft 100. The recess 5 extends with its negative cross section 6 in the axial direction of the screw tap 1. The non-circular cross section of the recess 5 ensures that a pin provided with a corresponding positive cross section is prevented from undergoing free rotational movement in the recess 5.

It is also essential that the recess 5 be suitable for receiving a positive-locking drive having a positive cross section corresponding to the recess 5. This is illustrated in particular in FIG. 5.

The advantageous drive option for the screw tap 1 depicted in FIG. 5 is effected by means of a two-arm tool ratchet 11, it being the case here that at least one lever arm 12 of the tool ratchet 11 can be unscrewed. The tool nut 13 of the tool ratchet 11 has a cross section that is complementary to the cross section of the recess 5.

According to the invention, this creates the option of inserting the working pin of a tool with a positive cross section corresponding to the recess 5 into the front end 4 of the screw tap 1, thus making it possible to transmit torque to the screw tap 1.

Moreover, it is clear from FIG. 5 in particular that a screw tap 1 implemented according to the invention has a high utility value. In this regard, it is conceivable, for example, to be able to position the screw tap 1 readily on machines in order to perform rethreading in hard-to-access areas and to drive it easily with a single-arm tool ratchet.

Particularly FIG. 1b, FIG. 2b and FIG. 1c show that the negative cross section 6 forms a polygonal line. In addition to this, FIG. 3b, in particular, shows that the negative cross section 6 can also be comprised of composite curvilinear shapes.

To form the negative cross section 6, it is essential, under these circumstances, that when the positive-locking drive is inserted, the corresponding positive cross section engages positive-lockingly, at least in one direction of rotation, in the negative cross section 6 of the recess 5.

For this purpose, a star-shaped or corrugated profile, such as a Torx profile, for example, could be contemplated for the negative cross section 6.

FIGS. 1b, 2b and 1c further show that the polygonal line forms a hexagon 7. Thus, particularly simple tools, such as, for example, socket wrenches for hexagon socket screws, can advantageously be used as a drive option for the screw tap 1.

Without any loss of quality, a screw tap 1 according to the invention can be used to cut thread by hand without the use of a tap wrench.

FIGS. 1a and 4, in particular, show that the recess 5 is a through-hole 8. In this illustrated preferred exemplary embodiment, the screw tap 1 can be driven at its drill bit head or at its drill bit tip.

In addition thereto, it is also conceivable for the recess 5 to be configured as a blind hole.

FIGS. 1a and 4 also show that the screw tap 1 has a front and a rear cutting portion 2.1 and 2.2.

FIGS. 1a and 4 show different embodiments of the screw tap 1. In FIG. 1, both cutting portions 2.1 and 2.2 have the same nominal diameter D. In the case of the screw tap 1 illustrated in FIG. 4, cutting portion 2.2 has a nominal diameter D2 that is greater than the nominal diameter D1 of cutting portion 2.1.

Regardless of circumstances, however, the peripheral diameter 20 of drive portion 3 is smaller than, or at most equal to, the smallest core diameter 30 presented by a cutting portion 2, 2.1 and 2.2.

Furthermore, FIG. 4 in particular shows that front cutting portion 2.1 is suitable for rough thread cutting and rear cutting portion 2.2 for finish thread cutting.

In this regard, it is also conceivable for the front and the rear cutting portions 2.1; 2.2 to be suitable for cutting mutually different thread types and/or thread sizes.

Such combinations of mutually different cutting portions 2.1; 2.2 might take the following forms: M24/M25×1.5 or G½/M22, etc.

Furthermore, either cutting portion 2.1; 2.2 can also readily be provided as an end cutter.

In that case, the front cutting portion has a long tap point like a rough cutter and the rear cutting portion can serve as the pilot pin in the thread, since it transitions seamlessly, with its first turn of thread, into the thread produced by the rough cutting.

To further improve the guide characteristics of such a cutting portion 2, it is provided that rear cutting portion 2.2 has, at least at its end 9 facing away from front cutting portion 2.1, a thread profile that is complete in cross section.

The figures also show that in addition to cutting portions 2.1 and 2.2, there is also provided the drive portion 3 that is disposed between them or at one end.

In addition hereto, particularly FIGS. 1a and 4 show that the cutting portions 2.1 and 2.2 are spaced apart from each other by the drive portion 3.

The figures also show that the drive portion 3 is profiled in such a way that tools can be applied to the outer contours for purposes of torque transmission. The utility value of the screw tap 1 is further increased by this feature in addition to the positive-locking drive according to the invention.

In addition thereto, the figures show that the drive portion 3 is configured in cross section as a hexagon 10. An exemplary application of this embodiment would be to bring the screw tap 1 into cutting position and deploy it by means of an open-ended wrench and a hexagonal socket wrench.

Regardless of circumstances, the peripheral radius of the drive portion 3 is smaller than, or at most equal to, the smallest core diameter of cutting portion 2, with the result that the screw tap consequent on the invention can also cut very deep holes, into which it sinks completely, and still be driven solely via the recess 5.

FIGS. 2a and 3a, in particular, illustrate an additional embodiment of the screw tap 1. Here the screw tap 1 has a front cutting portion 2 and a rear drive portion 3.

In contrast to screw taps 1 of prior art, the screw tap 1 offers plural options for applying torque, particularly at its drill bit head, by means of suitable tools.

The screw tap 1 according to the invention is intended in particular for cutting metric threads, although the screw tap 1 can also readily be designed to cut all types of thread, such as, for example, Whitworth gas threads, motion threads, round threads, fine threads or manufacturer-specific special threads.

The screw tap 1 according to the invention is also intended particularly for cutting thread sizes of M12 and above. Thread sizes below M12 can also be cut with the inventive screw tap 1, however.

The screw tap 1 is made in particular of high-speed steel.

The invention is not limited to the illustrated and described exemplary embodiments, but also encompasses all embodiments acting in like manner in the sense of the invention.

What is claimed is:

1. A screw tap comprising a shaft, having two cutting portions spaced apart from each other by a polygonal drive portion, the drive portion having a contour having a cross section complementary to fittable tools and adapted to act on the drive portion for purposes of torque transmission, wherein there is provided a supplementary drive portion for manually applying a torque to said screw tap to produce on one of the two cutting portions a cutting force, a recess of non-circular cross section is disposed in the front end and in the back end of said shaft, and extends with a negative cross section in an axial direction, and is provided to receive a manually driveable positive-locking drive having a positive cross section corresponding to said cross section of said recess.

2. The screw tap as in claim 1, wherein the negative cross section forms a polygonal line.

3. The screw tap as in claim 2, wherein the polygonal line defines a hexagon.

4. The screw tap as in claim 1, wherein said recess comprises a blind hole.

5. The screw up as in claim 1 wherein said recess comprises a through-hole.

6. The screw tap as in claim wherein the screw tap is provided with a front and a rear cutting portion.

7. The screw tap as in claim 6, wherein the front and rear cutting portions are adapted for cutting mutually different thread types and/or thread sizes.

8. The screw tap as in claim 6, wherein the front cutting portion is provided for rough thread cutting, and the rear cutting portion for finish thread cutting.

9. The screw tap as in claim in claim 8, wherein the rear cutting portion is provided, at an end thereof facing away from the front cutting portion, a thread profile that is complete in cross section.

10. The screw tap as in claim 6 wherein the drive portion is provided in addition to the cutting portions.

11. The screw tap as in claim 10, wherein the cutting portions are spaced apart from each other by the drive portion.

12. The screw tap as in claim 1 wherein said screw tap is provided with a cutting portion at one end and the drive portion at the other end.

13. The screw tap as in claim 12, wherein said shaft is configured in one piece with the drive portion and with said cutting portion.

14. The screw tap as in claim 1, wherein the drive portion is shaped in cross section as a hexagon.

15. The screw tap as in claim 1, wherein said screw tap is adapted for cutting threads measured in inches.

16. The screw tap as in claim 1, wherein said screw tap is adapted for cutting manufacturer-specific special threads.

17. The screw tap as in claim 1, wherein said screw tap is adapted for cutting threads measured metrically.

18. The screw tap as in claim 17, wherein said screw tap is adapted for cutting thread sizes of M12 and above.

19. The screw tap as in claim 1, wherein said screw tap is of high-speed steel.

20. The screw tap as in claim 1, wherein a peripheral diameter of the drive portion is smaller then, or equal to, a core diameter of the cutting portion.

\* \* \* \* \*